*(12)* United States Patent
DeFrance (10) Patent No.: US 10,873,180 B2
(45) Date of Patent: Dec. 22, 2020

(54) FASTENER ASSEMBLY

(71) Applicant: Burndy, LLC, Manchester, NH (US)

(72) Inventor: Robert V. DeFrance, Poughkeepsie, NY (US)

(73) Assignee: BURNDY, LLC, Manchester, NH (US)

( * ) Notice: Subject to any disclaimer, the term of this patent is extended or adjusted under 35 U.S.C. 154(b) by 0 days.

(21) Appl. No.: 16/525,229

(22) Filed: Jul. 29, 2019

(65) Prior Publication Data

US 2019/0356123 A1 Nov. 21, 2019

Related U.S. Application Data

(63) Continuation of application No. 15/956,508, filed on Apr. 18, 2018, now Pat. No. 10,374,407.

(60) Provisional application No. 62/602,239, filed on Apr. 18, 2017.

(51) Int. Cl.
*H02G 7/12* (2006.01)
*H02G 7/08* (2006.01)

(52) U.S. Cl.
CPC .............. *H02G 7/12* (2013.01); *H02G 7/08* (2013.01)

(58) Field of Classification Search
CPC .. H02G 7/12; H02G 7/08; H02G 7/00; H02G 7/02; H02G 7/04; H02G 7/14; H02G 7/20
USPC ....................................... 174/146, 40 CC, 42
See application file for complete search history.

(56) References Cited

U.S. PATENT DOCUMENTS

| | | | |
|---|---|---|---|
| 2,791,914 A * | 5/1957 | Cornelius | ............... F16B 19/00 74/527 |
| 2,915,580 A | 7/1957 | Gill et al. | |
| 2,974,184 A | 3/1961 | Mather | |
| 3,702,371 A | 11/1972 | Bloch et al. | |
| 3,743,762 A | 7/1973 | Annas et al. | |
| 3,924,055 A | 12/1975 | Moore et al. | |
| 4,178,467 A | 12/1979 | Hawkins | |
| 4,527,009 A | 7/1985 | Hawkins | |
| 6,448,503 B1 | 9/2002 | McKinnon et al. | |
| 6,943,290 B2 | 9/2005 | Dulhunty | |
| 7,197,806 B2 * | 4/2007 | Boudreaux | ............... F16B 5/02 29/434 |
| 8,393,840 B2 * | 3/2013 | Chiu | ..................... F16B 5/0266 411/353 |
| 8,829,353 B2 * | 9/2014 | Homner | ................. H01B 17/14 248/68.1 |
| 9,093,202 B2 | 7/2015 | Chan | |
| 9,106,062 B2 | 8/2015 | De France et al. | |
| 9,331,465 B2 | 5/2016 | Ortiz | |
| 9,412,493 B2 | 8/2016 | De France et al. | |
| 9,570,216 B2 | 2/2017 | Chan | |
| 10,267,349 B2 * | 4/2019 | Apostolopoulos | ...... F16B 35/06 |

(Continued)

OTHER PUBLICATIONS

International Search Report and Written Opinion mailed in PCT/US2018/028169 dated Aug. 3 2018.

*Primary Examiner* — Angel R Estrada (74) *Attorney, Agent, or Firm* — Wissing Miller LLP (57) ABSTRACT

Conductor spacer assemblies are disclosed that can be easily and rapidly clamped to parallel electrical conductors suspended between supports, and that can be easily and rapidly secured together with an automatically actuated fastener assembly. The conductor spacer assembly includes an upper spacer body that is coupled to a lower spacer body and an automatically actuated fastener assembly that facilitates quick and safe installation of the conductor spacer assemblies.

16 Claims, 10 Drawing Sheets

(56) References Cited

U.S. PATENT DOCUMENTS

| | | | |
|---|---|---|---|
| 10,374,407 B2* | 8/2019 | DeFrance | H02G 7/12 |
| 10,472,845 B2* | 11/2019 | Stevens | H01Q 1/12 |
| 2008/0173462 A1 | 7/2008 | Whapman et al. | |
| 2013/0067744 A1 | 3/2013 | De France et al. | |
| 2016/0352086 A1 | 12/2016 | De France et al. | |
| 2018/0233891 A1 | 8/2018 | Schrader | |

* cited by examiner

FASTENER ASSEMBLY

CROSS REFERENCE TO RELATED APPLICATIONS

This application is a continuation of co-pending application Ser. No. 15/956,508, filed Apr. 18, 2018, which claims priority to U.S. Provisional Application Ser. No. 62/602,239 filed Apr. 18, 2017 both of which are incorporated herein by reference in their entirety.

BACKGROUND

Field

The present disclosure relates generally to a structure for spacing electrical conductors spanning supports, and more particularly to a conductor spacer assembly that is economical to fabricate and that permits quick attachment to parallel electrical conductors.

Description of the Related Art

When two or more overhead electrical conductors are suspended between supports, such as electrical power distribution suspension towers, they can be in close proximity to each other so that it is often desirable to take measures to ensure that the electrical conductors do not come into contact with each other. To this end, one or more spacing devices are fixed between two parallel electrical conductors at intervals along the length the electrical conductors between the supports. However, attaching such spacing devices to the conductors can be difficult and time consuming as the electrical conductors may be swaying due to wind and other environmental conditions. Some spacing devices used to space the electrical conductors employ two opposing spacer bars that when joined form conductor clamps at each end. Such spacing devices are pulled together to clamp the electrical conductors to the spacing device, and then secured together with a bolt. As a result, a technician (or installer) has to pull the spacing bars together with the electrical conductors positioned within the clamps and then while holding the spacing device together the technician has to attached and tighten the bolt to secure the spacer bars together. Thus, there is a need for a spacing device that can be safely and quickly installed between parallel electrical conductors suspended between supports.

SUMMARY

The present disclosure provides exemplary embodiments of conductor spacer assemblies that can be easily and rapidly clamped to parallel electrical conductors suspended between supports, and that can be easily and rapidly secured together with an automatically actuated fastener assembly. In one exemplary embodiment, a conductor spacer assembly includes an upper spacer body, a lower spacer body and a fastener assembly. The upper spacer body includes a first clamp half, a second clamp half and a bore through the upper spacer body. The first clamp half is secured to or monolithically formed into a first end of the upper spacer body, and includes a first bushing half within the first clamp half. The second clamp half is secured to or monolithically formed into a second end of the upper spacer body, and includes a second bushing half within the second clamp half. The lower spacer body includes a third clamp half, a fourth clamp half and a tapered bore extending through the lower spacer body and capable of being aligned with the bore in the upper spacer body. The third clamp half is secured to or monolithically formed into a first end of the lower spacer body, and includes a third bushing half within the third clamp half. The fourth clamp half is secured to or monolithically formed into a second end of the lower spacer body, and includes a fourth bushing half within the fourth clamp half. In this exemplary embodiment, the first bushing half and the third bushing half form a first conductor clamp when the upper spacer body and the lower spacer body are moved to a clamping position. Similarly, the second bushing half and the fourth bushing half form a second conductor clamp when the upper spacer body and the lower spacer body are moved to the clamping position. The fastener assembly includes a fastener, a biasing member and a wedge pin. The fastener includes a cavity for receiving the biasing member and at least a portion of the wedge pin such that the biasing member and the at least a portion of the wedge pin are movable within the cavity. The biasing member and the at least a portion of the wedge pin are maintained within the cavity by a shoulder at a distal end of the fastener.

In another exemplary embodiment, a conductor spacer assembly includes an upper spacer body coupled to a lower spacer body such that the upper spacer body is longitudinally movable relative to the lower spacer body between an open position and a clamping position. In this embodiment, when in the clamping position a first end of the upper spacer body and a first end of the lower spacer body form a first conductor clamp, and a second end of the upper spacer body and a second end of the lower spacer body form a second conductor clamp. The conductor spacer assembly also includes a fastener assembly. The fastener assembly includes a fastener, e.g., a threaded bolt, a biasing member and a wedge pin. The fastener is configured to fit within a bore in the upper spacer body and includes a cavity for receiving the biasing member and at least a portion of the wedge pin so that the biasing member and the at least a portion of the wedge pin are movable within the cavity. The biasing member, e.g., a compression spring, and the portion of the wedge pin are maintained within the cavity by a shoulder at a distal end of the fastener. In the embodiment, as the bore is aligned with a tapered bore in the lower spacer body the biasing member causes the wedge pin to automatically move into the tapered bore.

The first conductor clamp can be formed by a first clamp half at the first end of the upper spacer body and a first bushing half within the first clamp half, and a second clamp half at a first end of the lower spacer body, and a second bushing half within the second clamp half. Similarly, the second conductor clamp can be formed by a third clamp half at a second end of the upper spacer body and a third bushing half within the third clamp half, and a fourth clamp half at a second end of the lower spacer body and a fourth bushing half within the fourth clamp half.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The present disclosure provides exemplary embodiments of conductor spacer assemblies that can be easily and rapidly clamped to parallel electrical conductors suspended between supports, and that can be easily and rapidly secured together with an automatically actuated fastener assembly. For ease of description, the conductor spacer assemblies may also be referred to herein as the "spacer assemblies" in the plural and the "spacer assembly" in the singular. In addition, the electrical conductors may also be referred to herein as the "conductors" in the plural and the "conductor" in the singular.

Figure 1:
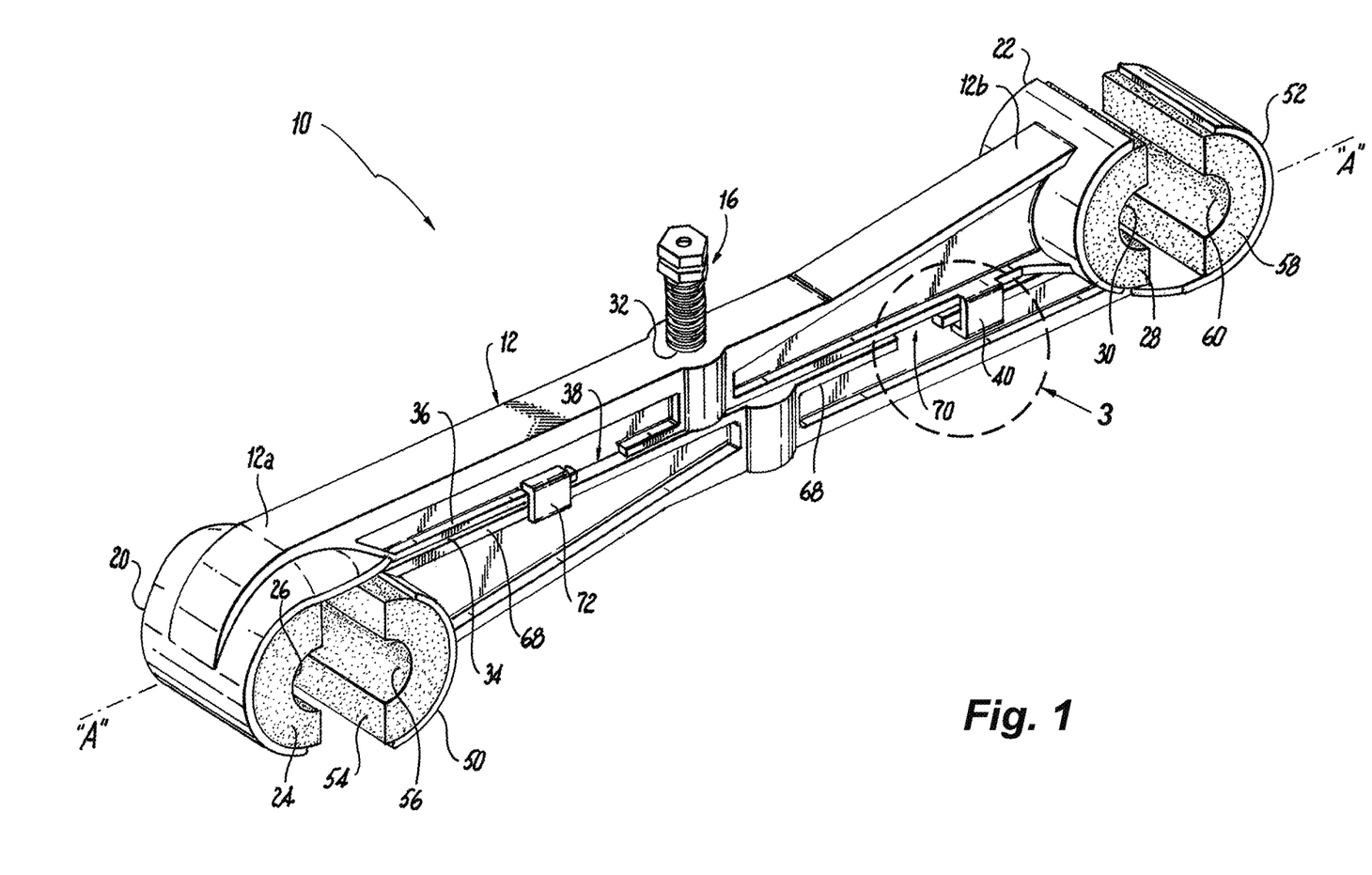
FIG. 1 is a top perspective view of an exemplary embodiment of a conductor spacer assembly according to the present disclosure, illustrating an upper spacer bar interconnected with and movable relative to a lower spacer bar.
Figures 2, 3:
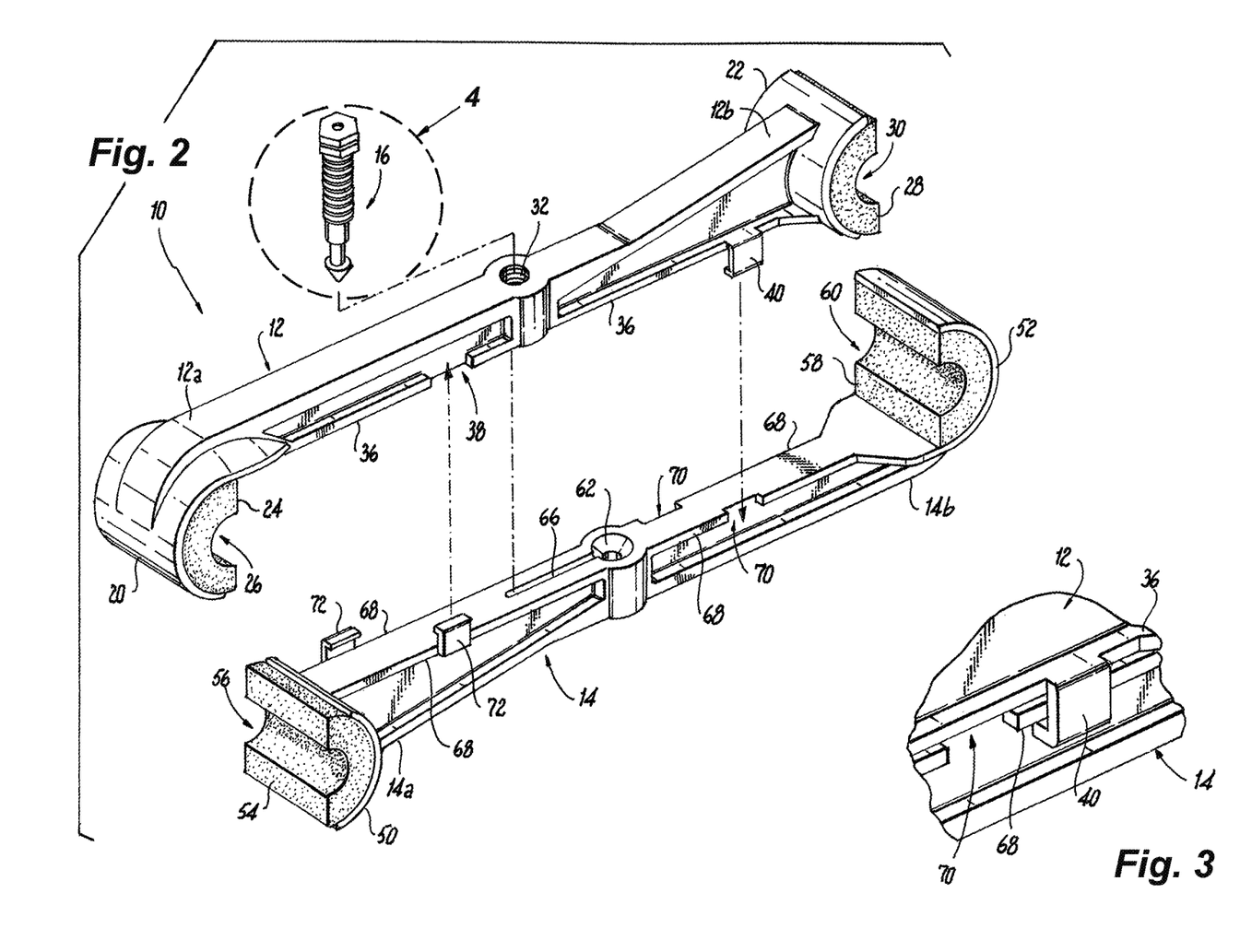
FIG. 2 is an exploded top perspective view of the conductor spacer assembly of FIG. 1.
FIG. 3 is a perspective view of a portion of the conductor spacer assembly of FIG. 1 taken from detail 3.
Figure 4:
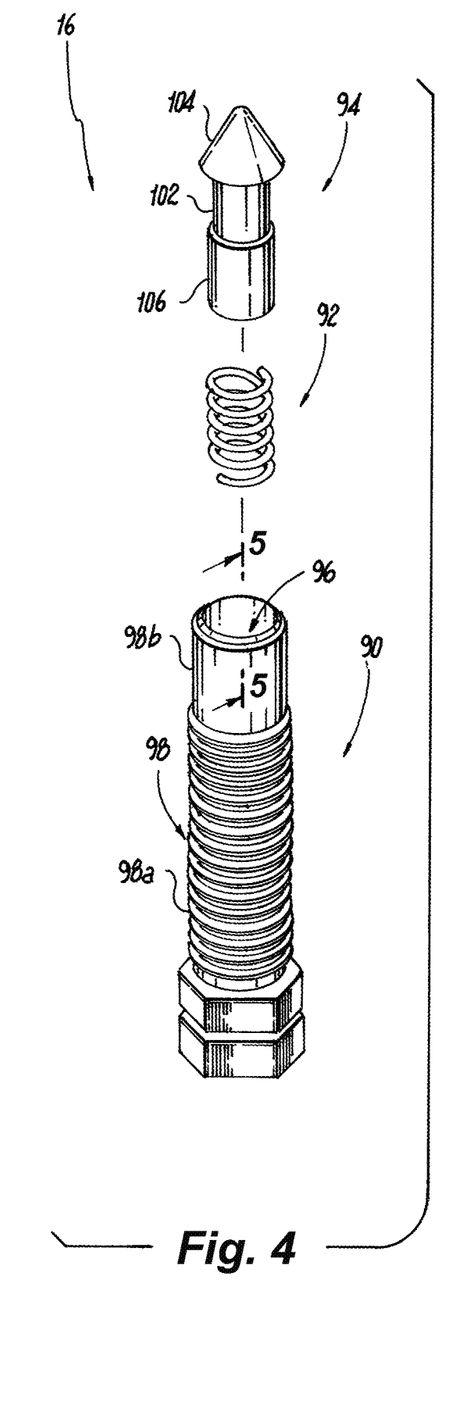
FIG. 4 is a perspective view with part separated of an exemplary embodiment of a fastener assembly of the conductor spacer assembly of FIG. 2 taken from detail 4 and illustrating a fastener, a biasing member and a wedge pin.

Referring now to FIGS. 1-3 an exemplary embodiment of a spacer assembly is shown. In this embodiment, the spacer assembly 10 includes an upper spacer body 12, a lower spacer body 14 and a fastener assembly 16. The upper spacer body 12 is an elongated member having longitudinal axis "A," a first end 12a terminating in a first clamp half 20 and a second end 12b terminating in a second clamp half 22. The first clamp half 20 and the second clamp half 22 may be secured to or monolithically or integrally formed into the upper spacer body 12. The first clamp half 20 is configured to receive and support a bushing half 24 having a conductor receiving recess 26. The conductor receiving recess 26 is configured and dimensioned to receive a portion of a conductor. In the embodiment shown, the conductor receiving recess 26 is semi-circular in shape. The conductor receiving recess 26 faces inwardly toward the center of the upper spacer body 12 along the longitudinal axis "A" of the spacer body, as seen in FIGS. 1 and 2. The second clamp half 22 is configured to receive and support a bushing half 28 having a conductor receiving recess 30. The conductor receiving recess 30 is configured and dimensioned to receive a portion of a conductor. In the embodiment shown, the conductor receiving recess 30 is semi-circular in shape. The conductor receiving recess 30 faces outwardly away from the center of the upper spacer body 12 along the longitudinal axis "A" of the spacer body, as seen in FIGS. 1 and 2. The bushing halves 24 and 28 can be made of an electrical insulating material. For example, the bushing halves 24 and 28 can be made of a resilient, elastomer material suitable for engaging conductors, e.g., conductors 200 and 300 seen in FIG. 11, to be spaced by the spacer assembly 10.

The upper spacer body 12 also includes a threaded bore 32 at a point between the first clamp half 20 and the second clamp half 22. In the embodiment shown, the bore 32 is positioned at a mid-point between the first clamp half 20 and the second clamp half 22. A lower surface 34 of the upper spacer body 12 includes a flange portion or track 36 on each side of the bore 32 and on each side of the lower surface 34. The flange portion or track 36 extends longitudinally along the length of the upper spacer body 12. The flange portion or track 36 includes one or more slots 38 that permit corresponding interlocking members 72 extending from an upper surface 64 of the lower spacer body 14 to pass, as described in more detail below.

Continuing to refer to FIGS. 1-3, the lower spacer body 14 is an elongated member having longitudinal axis "A," a first end 14a terminating in a first clamp half 50 and a second end 14b terminating in a second clamp half 52. The first clamp half 50 and the second clamp half 52 may be secured to or monolithically or integrally formed into the lower spacer body 14. The first clamp half 50 is configured to receive and support a bushing half 54 having a conductor receiving recess 56. The conductor receiving recess 56 is configured and dimensioned to receive a portion of a conductor. In the embodiment shown, the conductor receiving recess 56 is semi-circular in shape. The conductor receiving recess 56 faces outwardly away from the center of the lower spacer body 14 along the longitudinal axis "A" of the lower spacer body. The second clamp half 52 is configured to receive and support a bushing half 58 having a conductor receiving recess 60. The conductor receiving recess 60 is configured and dimensioned to receive a portion of a conductor. In the embodiment shown, the conductor receiving recess 60 is semi-circular in shape. The conductor receiving recess 60 faces inwardly toward the center of the lower spacer body 14 along the longitudinal axis "A" of the spacer body, as seen in FIGS. 1 and 2. The bushing halves 54 and 58 can be made of an electrical insulating material. For example, the bushing halves 54 and 58 can be made of a resilient, elastomer material suitable for engaging conductors, e.g., conductors 200 and 300 seen in FIG. 11, to be spaced by the spacer assembly 10.

The lower spacer body 14 also includes a tapered or countersunk bore 62 at a point between the first clamp half 50 and the second clamp half 52 that can align with the threaded bore 32 in the upper spacer body 12. In the embodiment shown, the bore 62 is positioned at a mid-point between the first clamp half 50 and the second clamp half 52. An upper surface 64 of the lower spacer body 14 includes a groove 66 that is parallel with the longitudinal axis "A" and that intersects with the tapered portion 62a of the bore 62 as seen in FIG. 2. The groove 66 is configured to receive a tip of a wedge pin of the fastener assembly 16 and is provided to guide the fastener assembly into engagement with the bore 62 when clamping the spacer assembly 10 to conductors, as described below. The groove 66 has a length "L" seen in FIG. 11 defining a desired longitudinal separation between the upper spacer body 12 and lower spacer body 14 when in an open position to receive the conductors, and a desired travel distance for the spacer assembly to travel before the fastener assembly 16 is automatically actuated to releasably lock the upper spacer body 12 to the lower spacer body 14. The upper surface 64 of the lower spacer body 14 includes a flange portion 68 on each side of the bore 62 and on each side of the upper surface 64. The flange portion 68 extends longitudinally along the length of the lower spacer body 14. The flange portion 68 includes one or more slots 70 that permit corresponding interlocking members 40 extending from lower surface 34 of the upper spacer body 12 to pass, as described in more detail below.

The interlocking members 40 and 72 are provided to releasably couple the upper spacer body 12 to the lower spacer body 14, as is known. As seen in FIG. 3, the interlocking of the interlocking member 40 extending from the upper spacer body 12 with the flange portion 68 of the lower spacer body 14 is shown. The interlocking members 40 and 72 also prevent the upper spacer body 12 and the lower spacer body 14 from rotating relative to each other.

When the upper spacer body 12 is releasably coupled to the lower spacer body 14, the upper spacer body 12 is longitudinally movable relative to the lower spacer body 14 between a clamping position and an open position. When in the clamping position, the first clamp half 20 of the upper spacer body 12 is positioned adjacent the first clamp half 50 of the lower spacer body 14 such that the bushing halves 24 and 54 form a first conductor clamp where a conductor, e.g., conductor 200 seen in FIG. 11, can rest within an opening formed by the conductor receiving recess 26 in the bushing half 24 and the conductor receiving recess 56 in the bushing half 54. Similarly, when in the clamping position, the second clamp half 22 of the upper spacer body 12 is positioned adjacent the second clamp half 52 of the lower spacer body 14 such that the bushing halves 28 and 58 form a second conductor clamp where a conductor, e.g., conductor 300 seen in FIG. 11, can rest within an opening formed by the conductor receiving recess 30 in the bushing half 28 and the conductor receiving recess 60 in the bushing half 58.

Figure 11:
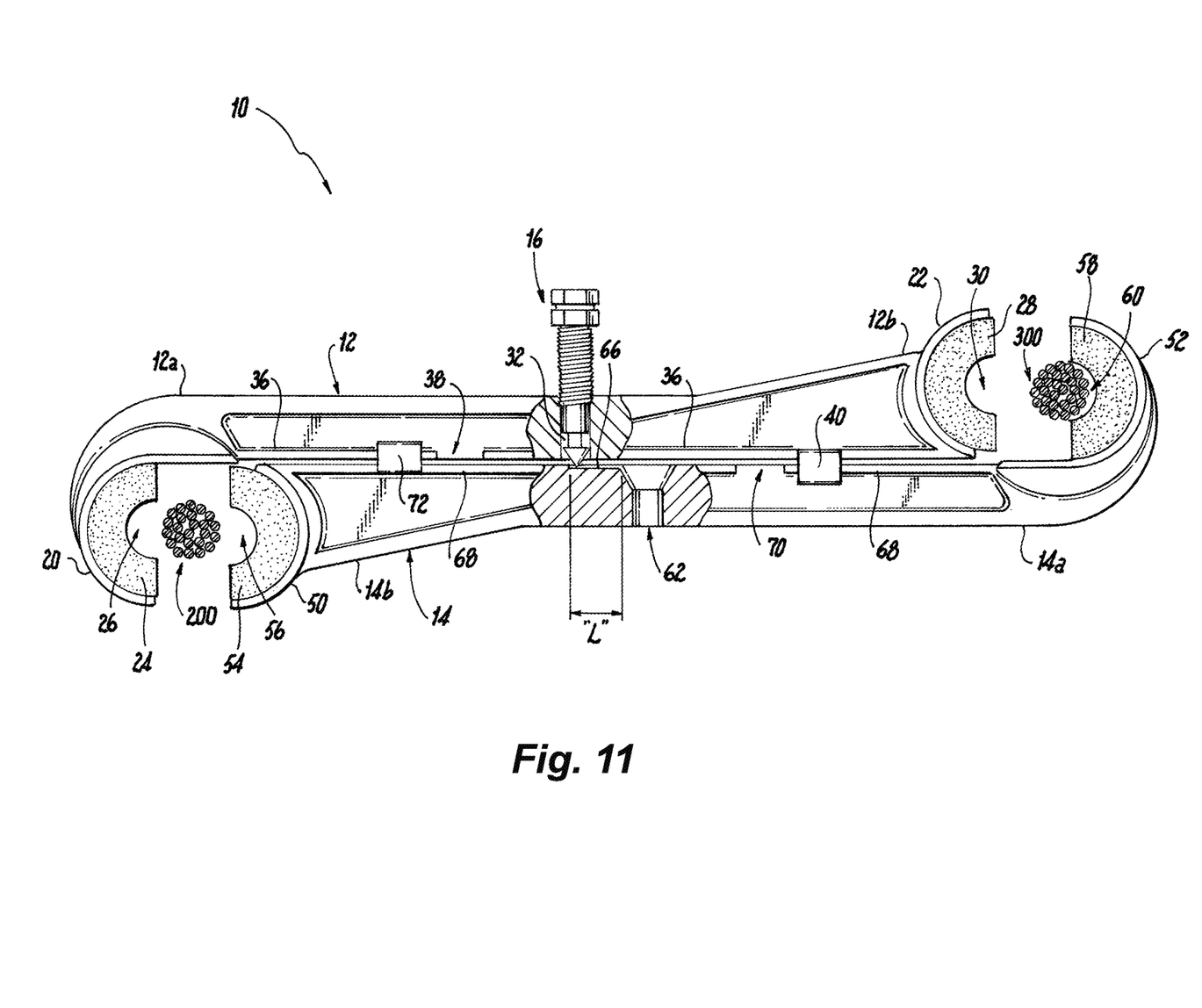
FIG. 11 is a side elevation view of the conductor spacer assembly of FIG. 1, illustrating the upper spacer bar interconnected with and movable relative to the lower spacer bar, conductors positioned between insulator bushings in the upper and lower spacer bars, and a cut-away of a fastening area of the upper and lower spacer bars.
Figure 12:
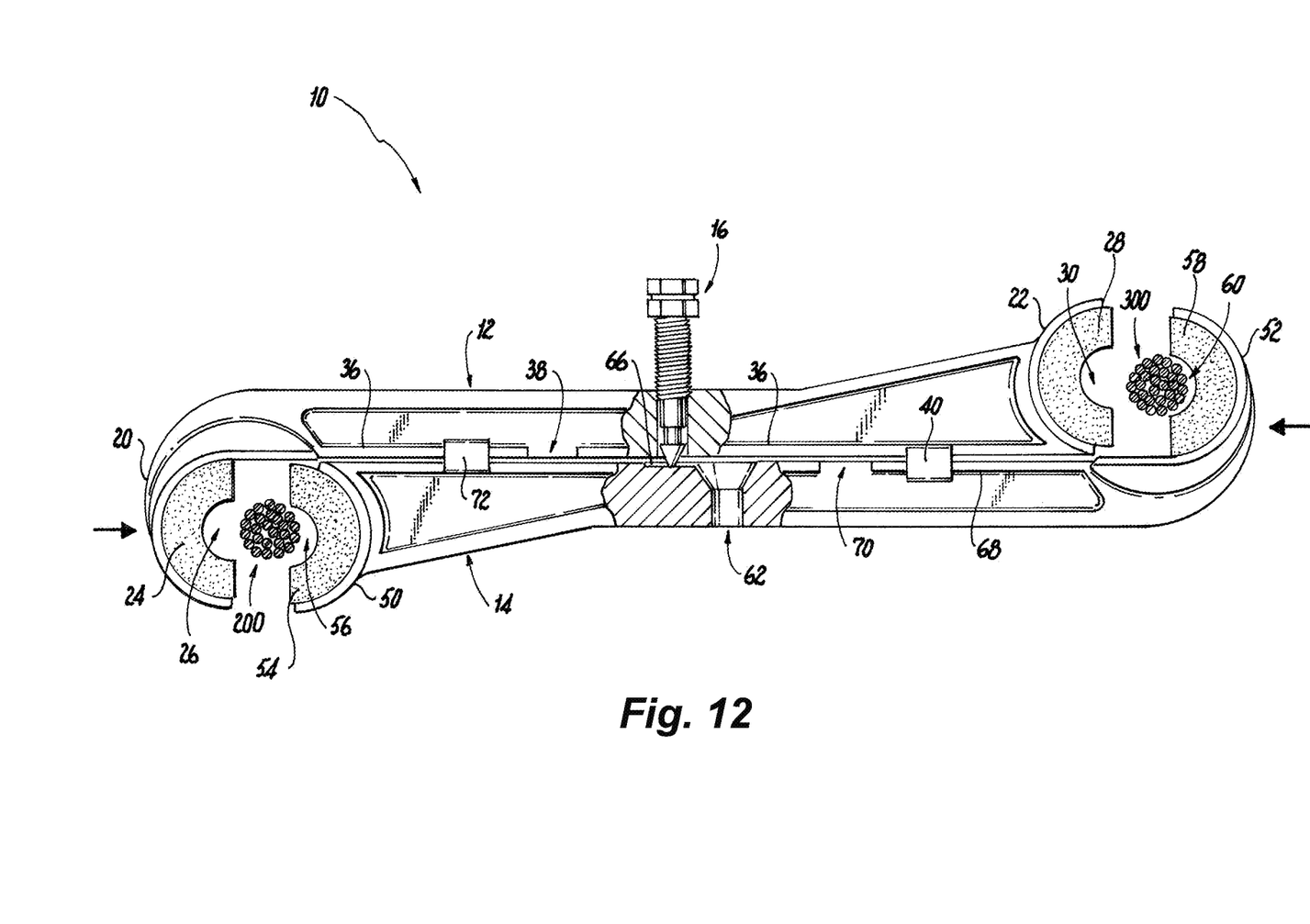
FIG. 12 is a side elevation view of the conductor spacer assembly of FIG. 1, illustrating the upper and lower spacer bars moving relative to each other to capture the conductors between the insulator bushings in the upper and lower spacer bars, and a cut-away of the fastening area of the upper and lower spacer bars.

When in the open position, there is a sufficient gap between the conductor receiving recess 26 in the bushing half 24 and the conductor receiving recess 56 in the bushing half 54 to permit the conductor, e.g., conductor 200 seen in FIG. 11, to be positioned for clamping by the first conductor clamp. Similarly, when in the open position, there is a sufficient gap between the conductor receiving recess 30 in the bushing half 28 and the conductor receiving recess 60 in the bushing half 58 to permit the conductor, e.g., conductor 300 seen in FIG. 11, to be positioned for clamping by the second conductor clamp.

A more detailed description of portions of the upper spacer body 12 and the lower spacer body 14, releasably coupling the upper spacer body 12 to the lower spacer body 14, and the clamping of conductors can be found in U.S. Pat. No. 3,743,762 which is incorporated herein in its entirety by reference.

Figure 5:
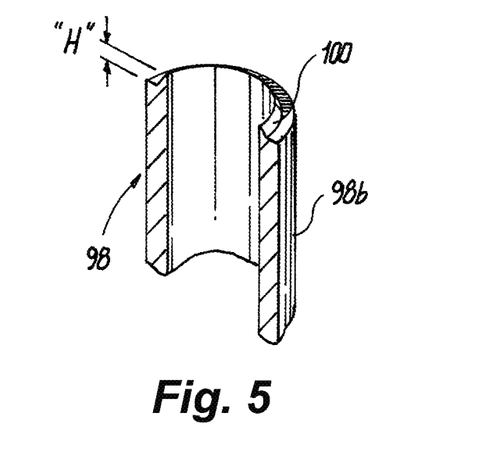
FIG. 5 is a cross-sectional view of the fastener assembly of FIG. 4 taken from line 5-5.
Figure 6:
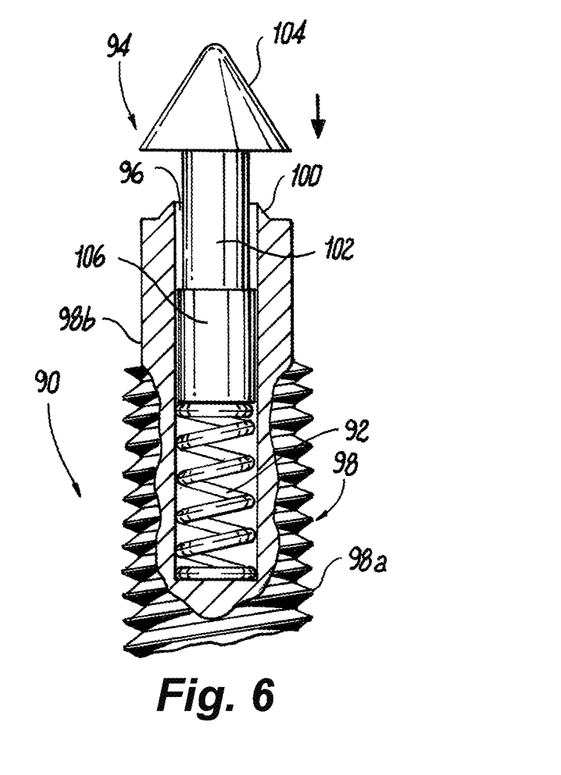
FIG. 6 is a partial cut away side elevation view of a portion of the fastener assembly of FIG. 4, illustrating a distal end of the fastener having a bore, a biasing member within the bore and a wedge pin within the bore and having an end resting against the biasing member.

Turning now to FIGS. 4-10, an exemplary embodiment of a fastener assembly 16 according to the present disclosure is shown. In this exemplary embodiment, the fastener assembly 16 includes a fastener 90, a biasing member 92 and a wedge pin 94. The fastener 90 has a cavity 96, e.g., a cylindrical cavity, configured to receive the biasing member 92 and a portion of the wedge pin 94. The fastener 90 has a shaft 98 with a threaded portion 98a and a smooth portion 98b. The threaded portion 98a of the shaft 98 is configured to fit within the threaded bore 32 in the upper spacer body 12. At the distal end of the fastener 90 is a rib 100 around the perimeter of the cavity 96, as seen in FIGS. 5 and 6. The rib 100 has a height "H" and is used to secure the biasing member 92 and wedge pin 94 within the cavity 96 as described below. The biasing member 92 in the exemplary embodiment shown is a compression spring configured to fit within the cavity 96. The wedge pin 94 has a shaft 102, a tapered tip 104 at a distal end of the shaft 98 and a barrel 106 at a proximal end of the shaft 98 that contacts the biasing member 92 when in the cavity 96. The barrel 106 preferably has a diameter that is greater than the diameter of the shaft 102.

Figure 7:
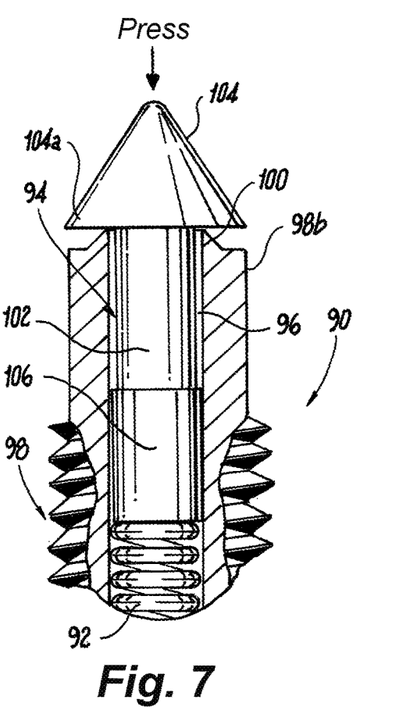
FIG. 7 is a partial cut away side elevation view of the portion of the fastener assembly of FIG. 6, illustrating a tip of the wedge pin being pressed to contact with a rib at the distal end of the fastener.
Figure 8:
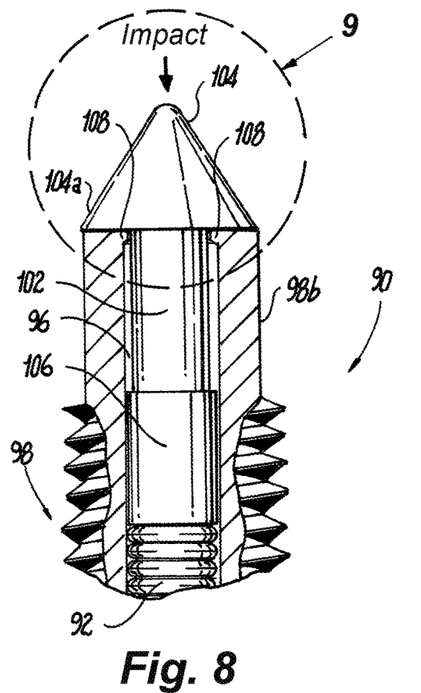
FIG. 8 is a partial cut away side elevation view of the portion of the fastener assembly similar to FIG. 7, illustrating the tip of the wedge pin impacting the rib at the distal end of the fastener causing the rib to flatten to form a rib boss.
Figure 9:
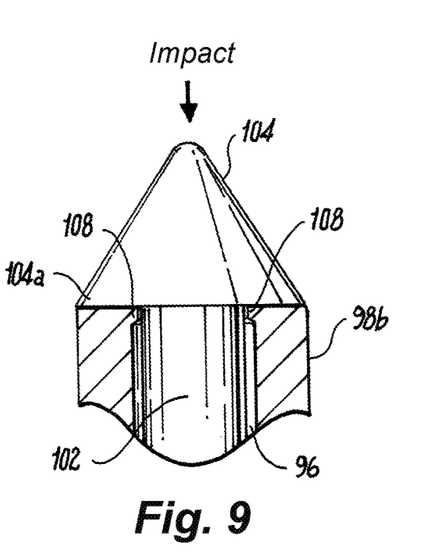
FIG. 9 is an enlarged view of the partial cut away side elevation view of the portion of the fastener assembly of FIG. 8 taken from detail 9, and illustrating the tip of the wedge pin impacting the rib at the distal end of the fastener forming the rib boss.
Figure 10:
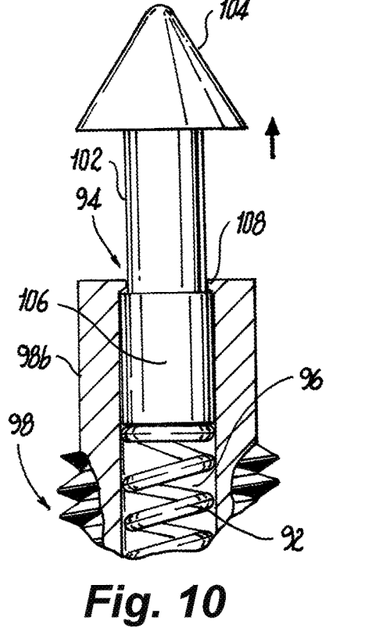
FIG. 10 is a partial cut away side elevation view of the portion of the fastener assembly of FIG. 6, illustrating the tip of the wedge pin moving away from the distal end of the fastener revealing the rib boss movably securing the wedge pin within the bore.

To secure the biasing member 92 and the barrel 106 of the wedge pin 94 within the cavity 96 the biasing member 92 is first inserted into the cavity 96 so that it bottoms-out at the bottom of the cavity as seen in FIG. 6. The barrel 106 of the wedge pin 96 is then inserted into the cavity 96 so that the barrel 106 contacts the biasing member 92. The fastener assembly 16 is then installed in a manual or automatically operated press, and the tip 104 of the wedge pin 94 is pressed in a direction toward a proximal end of the fastener 90 until the wider portion 104a of the tip 104 contacts the rib 100 of the fastener 90, as seen in FIG. 7. The tip 104 of the wedge pin 94 is then further pressed or impacted (using the press) so that the rib 100 folds or deforms into the cavity 96 forming a shoulder 108, seen in FIGS. 8 and 9. The shoulder 108 maintains the biasing member 92 and the barrel 106 of the wedge pin 94 within the cavity 96 by preventing the barrel 106 of the wedge pin 94 from exiting the cavity as seen in FIG. 10. In this exemplary embodiment, the shaft 102 and barrel 106 of the wedge pin 94 are movable within the cavity and independent of the shaft 98 of the fastener 90. As a result, as the shaft 98 of the fastener 90 rotates the tip 104 of the wedge pin 94 does not rotate with the rotation of the shaft 98. The biasing member 92 normally biases the tip 104 of the wedge pin 94 away from the distal end of the fastener 90.

Figures 13, 14:
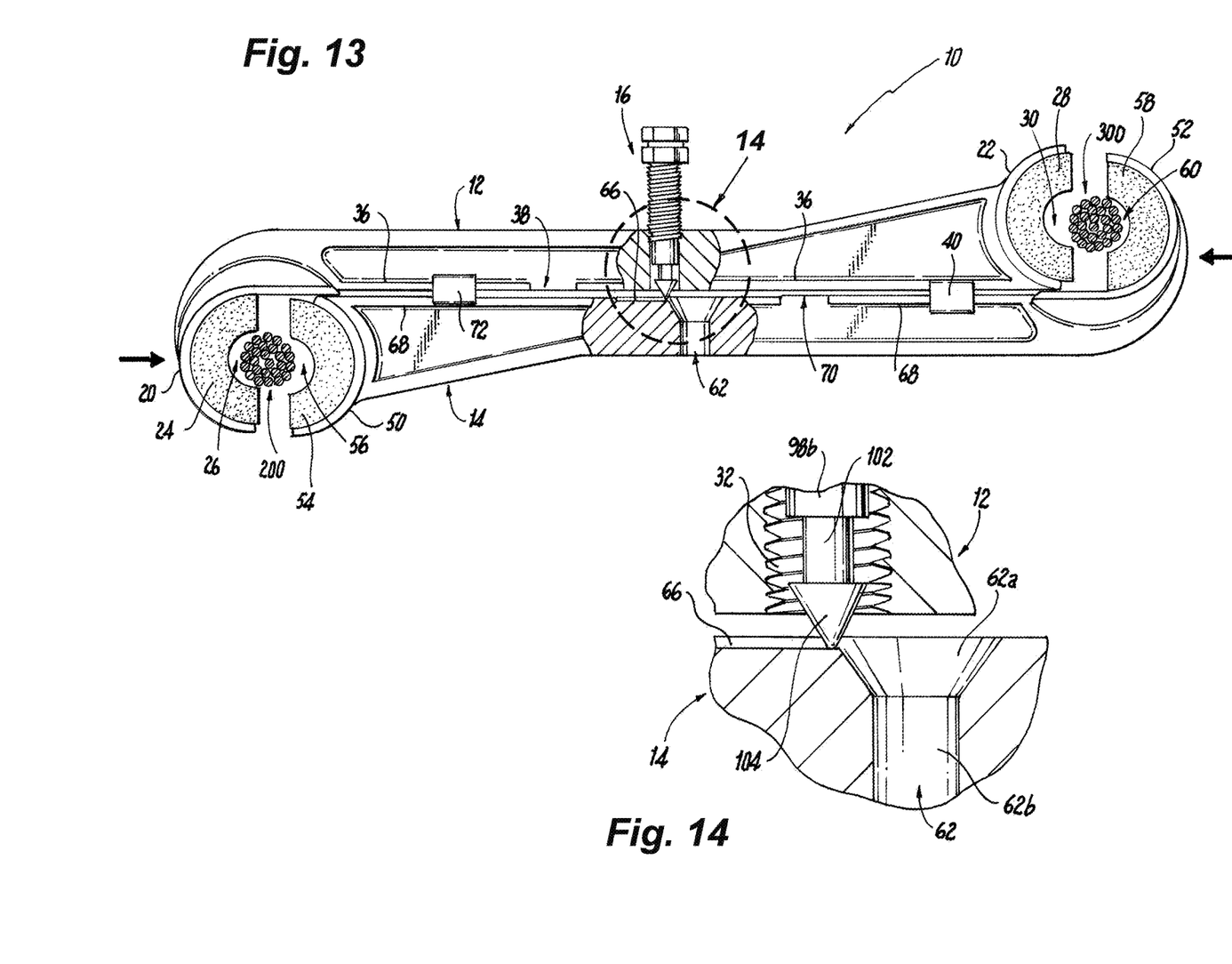
FIG. 13 is a side elevation view of the conductor spacer assembly of FIG. 12, illustrating the upper and lower spacer bars continuing to move relative to each other to capture the conductors between the insulator bushings in the upper and lower spacer bars, and the cut-away of the fastening area of the upper and lower spacer bars.
FIG. 14 is an enlarged view of the cut-away of the fastening area of the upper and lower spacer bars of FIG. 13 taken from detail 14, and illustrating the tip of the wedge pin positioned to automatically lock the upper spacer bar to the lower spacer bar.

The operation of the spacer assembly 10 according to the present will be described with reference to FIGS. 11-18. To clamp the spacer assembly 10 to two spaced apart conductors, the upper spacer body 12 of the spacer assembly 10 is coupled to the lower spacer body 14 as described above and the spacer bodies 12 and 14 are set in the open position. In the open position, the fastener 90 of the fastener assembly 16 is threaded into the bore 32 of the upper spacer body 12 such that the biasing member 92 compresses as the tip 104 of the wedge pin 94 contacts the groove 66 in the upper surface 64 of the lower spacer body 14. A first conductor 200 is then positioned within the first conductor clamp and a second conductor 300 is positioned within the second conductor clamp, as seen in FIG. 11. A technician then moves the upper spacer body 12 and/or the lower spacer body 14 relative to each other, as seen by the arrows in FIG. 12, causing the first clamp half 20 of the upper spacer body 12 and the first clamp half 50 of the lower spacer body 14 to move toward the clamping position, and causing the second clamp half 22 of the upper spacer body 12 and the second clamp half 52 of the lower spacer body 14 to move toward the clamping position. As the upper spacer body 12 and lower spacer body 14 move relative to each other, the tip 104 of the wedge pin 94 moves in and along the groove 66 in the upper surface 64 of the lower spacer body 14 toward the tapered bore 62 in the lower spacer body 14. As noted, with the tip 104 of the wedge pin 94 in the groove 66, the biasing member 92 is compressed. Thus, when the tip 104 of the wedge pin 94 reaches an edge of the tapered portion 62a of the tapered bore 62, the fastener assembly is armed for automatic activation, as seen in FIGS. 13 and 14.

Figures 15, 16:
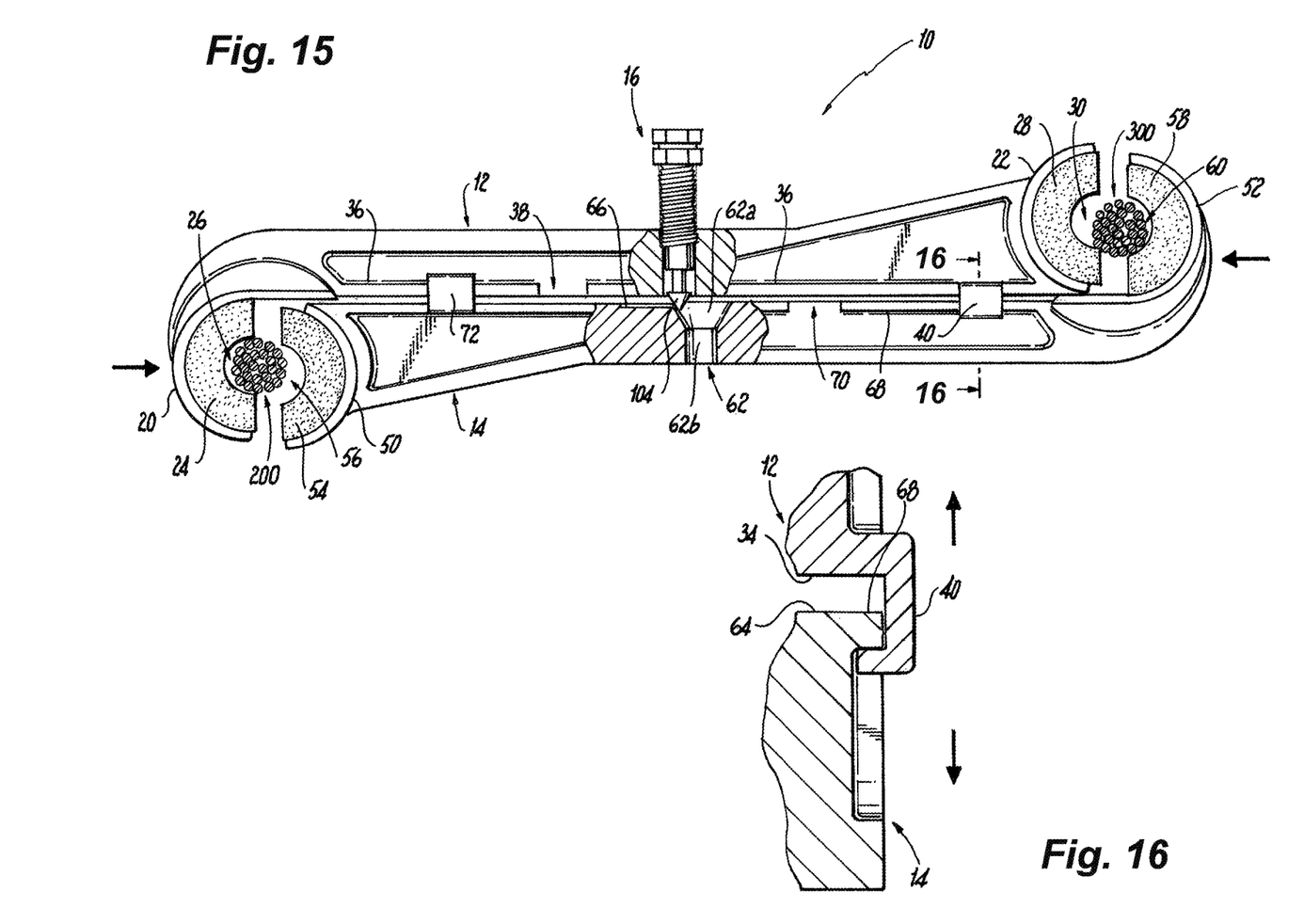
FIG. 15 is a side elevation view of the conductor spacer assembly of FIG. 1, illustrating the upper and lower spacer bars continuing to move relative to each other to capture the conductors between the insulator bushings in the upper and lower spacer bars, and the cut-away of the fastening area of the upper and lower spacer bars showing the tip of the wedge pin positioned within a tapered hole in the lower spacer bar.
FIG. 16 is a cross-sectional view of the upper spacer bar and lower spacer bar of FIG. 15 taken from line 16-16.

Continued movement of the upper spacer body 12 and lower spacer body 14 relative to each other causes the tip 104 of the wedge pin 94 to pass a threshold where the tip 104 of the wedge pin 94 begins to automatically enter the tapered portion 62a of the bore 62 due to the basing force of the biasing member 92. When the tip 104 of the wedge pin 94 enters the tapered portion 62a of the tapered bore 62 the biasing force of the biasing member 92 also causes the lower surface 34 of the upper spacer body 12 to move away from the upper surface 64 of the lower spacer body 14, as seen in FIGS. 15 and 16. When the lower surface 34 of the upper spacer body 12 separates from the upper surface 64 of the lower spacer body 14 the interlocking members 40 and 72 engage the flange portions 68 and 36, respectively, creating a friction fit that limits the movement of the upper spacer body 12 relative to the lower spacer body 14 allowing the technician to release the spacer assembly 10 while the conductor 200 remains within the first conductor clamp and the conductor 300 remains within the second conductor clamp.

Figure 17:
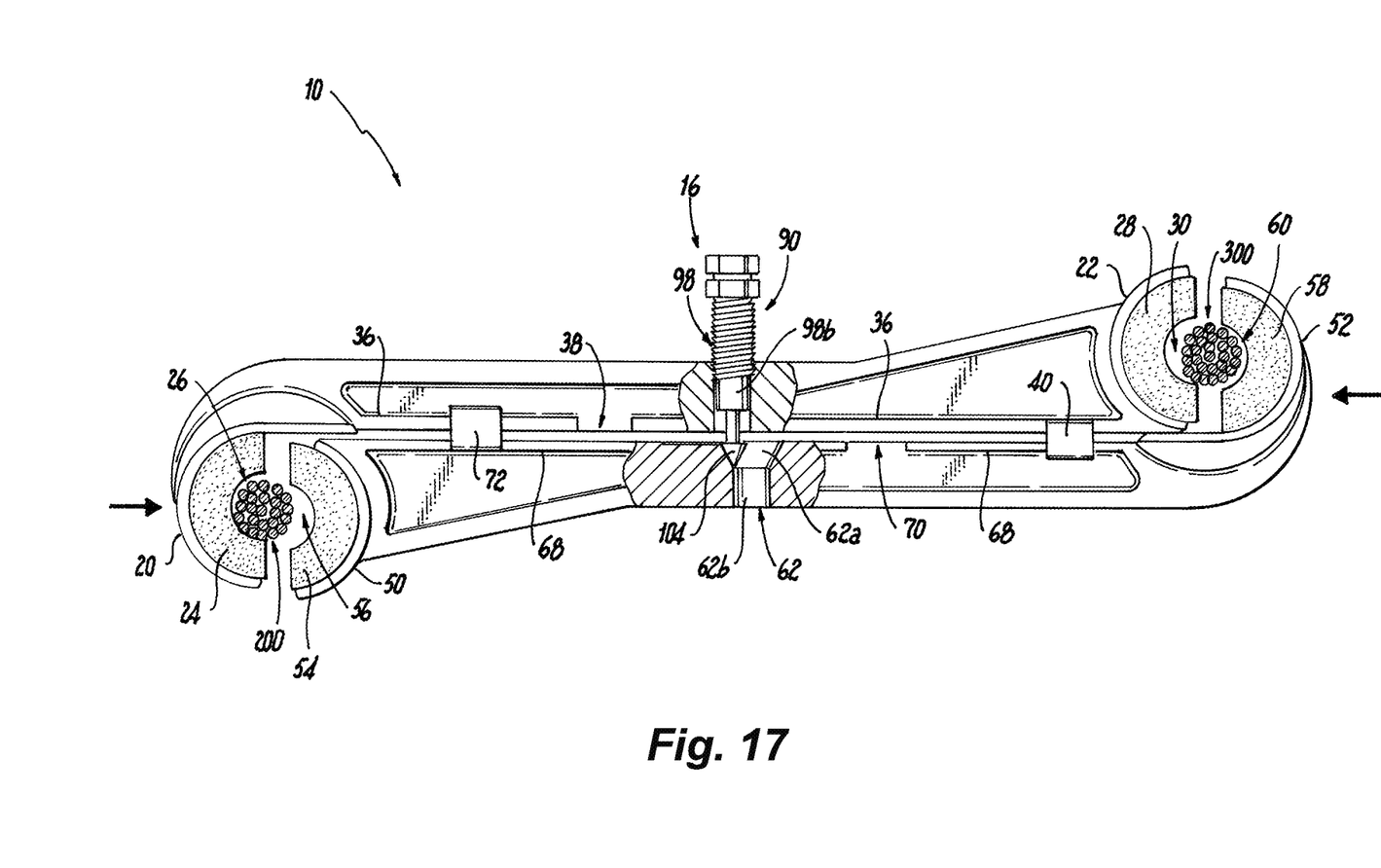
FIG. 17 is a side elevation view of the conductor spacer assembly of FIG. 15, illustrating the upper and lower spacer bars continuing to move relative to each other to capture the conductors between the insulator bushings in the upper and lower spacer bars, and the cut-away of the fastening area of the upper and lower spacer bars showing the tip of the wedge pin positioned further within the tapered hole in the lower spacer bar.
Figure 18:
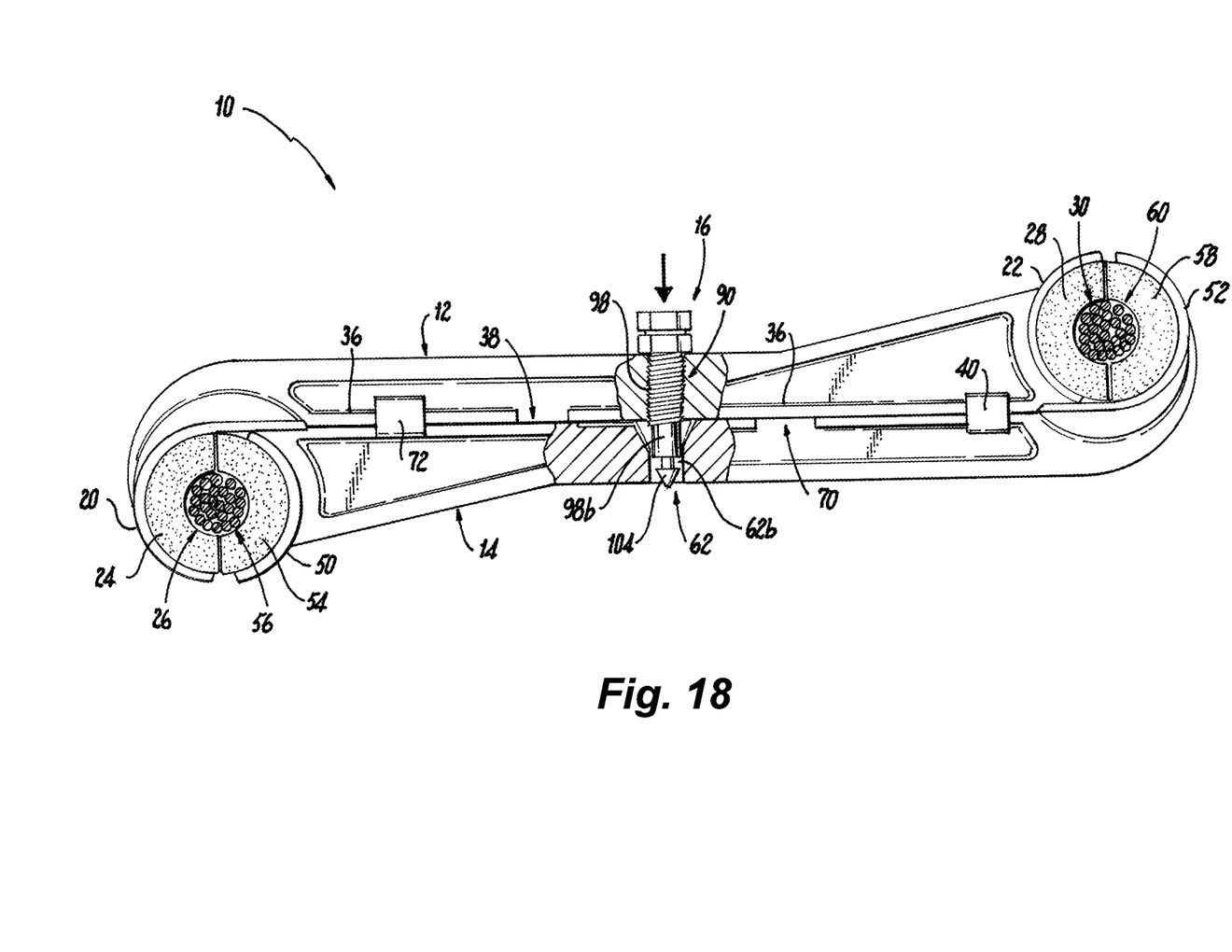
FIG. 18 is a side elevation view of the conductor spacer assembly of FIG. 17, illustrating the upper and lower spacer bars in a clamping position clamping the conductors between the insulator bushings in the upper and lower spacer bars, and the cut-away of the fastening area of the upper and lower spacer bars showing the distal end of the fastener of the fastener assembly extending into the tapered hole in the lower spacer bar.

At this point, the technician can then tighten the fastener 90 of the fastener assembly 16, which causes the tip 104 of the wedge pin 94 to slide along the tapered portion 62a of the tapered bore 62 which causes the upper spacer body 12 to move relative to the lower spacer body to further clamp the conductor 200 within the first conductor clamp and the conductor 300 within the second conductor clamp, as seen in FIG. 17. As noted above, the wedge pin 94 is independent of the shaft 98 of the fastener 90 such that as the shaft 98 of the fastener 90 is tightened, the tip 104 of the wedge pin 94 does not rotate with the rotation of the shaft 98. This allows the tip 104 of the wedge pin 94 to slide along the tapered portion 62a of the tapered bore 62 reducing the potential of damaging the tapered portion 62a of the tapered bore 62. As the fastener 90 is further tightened, the smooth portion 98b of the fastener 98 enters a narrow portion 62b of the tapered bore 62 which further prevents longitudinal movement of the upper spacer body 12 relative to the lower spacer body 14, as seen in FIG. 18. At this point, the upper spacer body 12 and the lower spacer body 14 are in the clamping position where conductor 200 sits within the conductor receiving recess 26 in the first clamp half 20 and the conductor receiving recess 56 in the first clamp half 50, which as noted above form the first conductor clamp. In addition, the conductor 300 sits within the conductor receiving recess 30 in the second clamp half 22 and the conductor receiving recess 60 in the second clamp half 52, which as noted above form the second conductor clamp.

From the foregoing description it should now be apparent that a new and useful spacer assembly has been disclosed that can be easily and rapidly clamped to parallel electrical conductors suspended between supports. The foregoing embodiments and advantages are merely exemplary and are not to be construed as limiting the scope of the present invention. The description of an exemplary embodiment of the present invention is intended to be illustrative, and not to limit the scope of the present invention. Various modification, alternatives and variations will be apparent to those of ordinary skill in the art, and are intended to fall within the scope of the invention.

What is claimed is:

1. A fastener assembly used to couple objects together, the fastening assembly comprising:
   a fastener having a cavity starting at a distal end of the fastener and extending into the fastener;
   a biasing member movably positioned within the cavity; and
   a wedge pin having a shaft, a tapered tip at a first end of the shaft and a barrel at a second end of the shaft, wherein a diameter of the barrel is greater than a diameter of the shaft, and a diameter of a widest portion of the tapered tip is greater than a diameter of the cavity, wherein an end of the barrel is in contact with the biasing member, and wherein at least a portion of the shaft and the barrel are within the cavity and movable within the cavity;
   wherein the biasing member and at least the barrel are maintained within the cavity by a shoulder at a distal end of the fastener.

2. The fastener assembly according to claim 1, wherein the fastener comprises a fastener shaft with a threaded portion at a proximal end portion and a smooth portion at a distal end portion.

3. The fastener assembly according to claim 1, wherein the fastener comprises a threaded bolt.

4. The fastener assembly according to claim 1, wherein the biasing member comprises a compression spring.

5. The fastener assembly according to claim 1, wherein the biasing member normally biases the tapered tip of the wedge pin in a direction away from the distal end of the fastener.

6. The fastener assembly according to claim 1, wherein the shoulder engages the barrel to maintain the biasing member and at least the barrel within the cavity.

7. A fastener assembly used to couple objects together, the fastening assembly comprising:
   a threaded bolt having a cavity starting at a distal end of the bolt and extending into the bolt;
   a compression spring positioned within the cavity; and
   a wedge pin having a shaft, a tapered tip at a first end of the shaft and a barrel at a second end of the shaft, wherein a diameter of the barrel is greater than a diameter of the shaft, and a diameter of a widest portion of the tapered tip is greater than a diameter of the cavity, and wherein an end of the barrel is in contact with the biasing member, and at least a portion of the shaft and the barrel are within the cavity and movable within the cavity, the compression spring and at least the barrel being maintained within the cavity by a shoulder at a distal end portion of the threaded bolt.

8. The fastener assembly according to claim 7, wherein the threaded bolt comprises a shaft with a threaded portion at a proximal end portion of the threaded bolt shaft and a smooth portion at the distal end of the threaded bolt shaft.

9. The fastener assembly according to claim 7, wherein the compression spring normally biases the tapered tip of the wedge pin in a direction away from the distal end of the threaded bolt.

10. The fastener assembly according to claim 7, wherein the shoulder engages the barrel to maintain the compression spring and at least the barrel within the cavity.

11. A fastener assembly used to couple objects together, the fastening assembly comprising:
   a fastener having shaft with a proximal end portion, a distal end portion and a cavity in the shaft extending from the distal end portion toward the proximal end portion;
   a biasing member movably positioned within the cavity; and
   a wedge pin having a shaft, a tapered tip at a distal end of the wedge pin shaft and a barrel at a proximal end of the wedge pin shaft, wherein a diameter of the barrel is greater than a diameter of the wedge pin shaft, and a diameter of a widest portion of the tapered tip is greater than a diameter of the cavity, the wedge pin being movably positioned at least partially within the cavity adjacent the biasing member and such that the biasing member normally biases the tapered tip of the wedge pin in a direction away from the distal end portion of the fastener shaft; and
   wherein the biasing member and at least the barrel of the wedge pin are maintained within the cavity by a shoulder at a distal end of the fastener.

12. The fastener assembly according to claim 11, wherein the fastener shaft comprises a threaded portion at the proximal end portion and a smooth portion at the distal end portion.

13. The fastener assembly according to claim 11, wherein the fastener comprises a threaded bolt.

14. The fastener assembly according to claim 11, wherein the biasing member comprises a compression spring.

15. The fastener assembly according to claim 11, wherein the shoulder engages the barrel to maintain the biasing member and the at least a portion of the wedge pin within the cavity.

16. The fastener assembly according to claim 11, wherein the shoulder is formed by deforming a rib at the distal end of the fastener.

* * * * *